United States Patent [19]

Hazebrook

[11] Patent Number: 4,634,402
[45] Date of Patent: Jan. 6, 1987

[54] UNIVERSAL JOINT CAPABLE OF ACCOMMODATING THRUST LOADS

[75] Inventor: Daniel W. Hazebrook, Detroit, Mich.

[73] Assignee: GKN Automotive Components Inc., Southfield, Mich.

[21] Appl. No.: 704,197

[22] Filed: Feb. 22, 1985

[51] Int. Cl.[4] ................................................ F16D 3/16
[52] U.S. Cl. ..................................... 464/141; 464/140
[58] Field of Search ..................... 81/177.75; 464/139, 464/140, 141, 146, 906, 145

[56] References Cited

U.S. PATENT DOCUMENTS

| | | | |
|---|---|---|---|
| 1,103,716 | 7/1914 | Wallbillich | 464/141 X |
| 1,111,645 | 9/1914 | Chadwick | 81/177.75 X |
| 2,615,317 | 10/1952 | Rzeppa | 464/141 |
| 3,017,756 | 1/1962 | Sharp | 464/906 X |
| 3,107,505 | 10/1963 | Koss | 464/141 |
| 3,802,221 | 4/1974 | Kimata | 464/141 |
| 4,083,201 | 4/1978 | Krude et al. | 464/906 X |
| 4,156,354 | 5/1979 | Krude | 464/141 |
| 4,325,232 | 4/1982 | Girguis | 464/906 X |
| 4,472,159 | 9/1984 | Krude | 464/906 X |

FOREIGN PATENT DOCUMENTS

| | | | |
|---|---|---|---|
| 1185868 | 1/1965 | Fed. Rep. of Germany | 464/141 |
| 2089935 | 6/1982 | United Kingdom | 464/141 |
| 2115521 | 9/1983 | United Kingdom | 464/141 |

Primary Examiner—Stuart S. Levy
Assistant Examiner—Daniel P. Stodola
Attorney, Agent, or Firm—Remy J. VanOphem

[57] ABSTRACT

A universal joint for transmitting driving torque between rotative members including an inner joint member for connection to one of the rotative members and an outer joint member for connection to the inner joint member and to the other of the rotative members. The inner joint member swivels within the outer joint member by virtue of contacting inner and outer spherical surface portions on the outer and inner joint members, respectively. Torque is transmitted between the inner and outer joint members by a plurality of roller balls which extend between a recess in the inner joint member and a plurality of circumferentially spaced-apart rectilinear recesses in the outer joint member which are disposed between the spherical inner surface portions on the outer joint member. The recess in the inner joint member permits the spherical roller balls to come into contact with one another, and the rectilinear recesses in the outer joint member permit the roller balls to separate when the inner and outer joint members articulate with respect to one another.

8 Claims, 8 Drawing Figures

UNIVERSAL JOINT CAPABLE OF ACCOMMODATING THRUST LOADS

BACKGROUND OF THE INVENTION

1. Field of the Invention

The present invention relates to an improved universal joint for connecting drive and driven members and, more particularly, the invention relates to a universal joint which provides a smooth, lash-free drive between the drive and driven members when the members are in high speed operation, offset at an angle, or have misalignment between the members. Transmission of torque between the members of the joint is achieved by roller balls which extend between opposed recesses in the inner and outer joint members and are free to freely rotate in both the inner and outer joint members. A multiplicity of such joints can be cascaded or connected in series to increase the degree of offset or misalignment that can be accommodated between the drive and driven members and/or the spacing therebetween. The universal joint of the present invention also has an improved ability to absorb end loads, without transmitting such end loads to the torque transmitting roller balls.

2. Description of the Prior Art

Many efforts are shown in the known prior art to achieve better transmission of torque. These usually involve either a Cardan-type joint, such as shown in U.S. Pat. No. 4,156,354, or a constant velocity joint of the type shown in U.S. Pat. No. 2,910,845 or in U.S. Pat. No. 4,377,385. Each of these devices involves the transmission of torque between rotative members and can be said to involve an inner joint member fixed to one of the rotative members, and an outer joint member fixed to the other of the rotative members.

U.S. Pat. No. 4,156,354 shows a high-speed, high-torque transmitting joint where the torque is transmitted through roller bodies interposed between inner and outer joint members wherein the roller bodies are equidistantly spaced circumferentially of the joint assembly, with each roller body being received in planar recesses in the inner joint member for radially slidable engagement relative thereto. This construction increases the complexity and size of the joint, and requires close maintenance of surface finish and other manufacturing tolerances. Because of these reasons and the increased friction resulting from the sliding relationship of the planar surfaces, this type of joint has decreased smoothness of operation, and at the same time has increased manufacturing costs.

In addition, increased friction results because of the sliding relationship of the planar surfaces. For these reasons, it provides a generally unsatisfactory solution to the problem of torque transmission.

U.S. Pat. No. 2,910,845 shows a constant velocity universal joint intended for connecting two rotative members only where angularly misaligned joints are to be found, and not where axially aligned or slightly misaligned joints are to be found and, therefore, shows a joint limited in its usefulness. Further, the joint utilizes spherical drive members restrained to rotate about journals provided on the drive member. The restraining of the drive members provides increased friction, which is unsatisfactory in a universal joint.

U.S. Pat. No. 4,377,385 shows a constant velocity universal joint in which the torque transmitting roller balls are separated from one another at all times during the normal operation of the joint by an extension of the inner joint member that has a complex ball-engaging external surface. This construction is quite complex and expensive, and would economically preclude the use of such a universal joint for many applications.

What is needed to solve the above problems present in the prior art is an improved universal joint usable for angular and axial misalignment and having increased smoothness of operation due to the elimination of planar surfaces on the drive members, which can be made with lower manufacturing costs because of less critical tolerances and surface contours and finishes, and which is capable of absorbing end loads without transmitting such end loads.

U.S. Pat. No. 2,910,845 utilizes spherical drive members restrained to rotate about journals provided on the drive member which again causes increased friction and is unsatisfactory.

SUMMARY OF THE PRESENT INVENTION

Briefly, the present invention may be described as a universal joint for transmitting driving torque including a pintle-type inner joint member which is fixed to one of the rotative members or which may be a part of such rotative member, and an outer joint member which is fixed to the other of the rotative members, or which may also be a part of such rotative member, with a plurality of roller balls received in aperture means in the inner joint member, and having the roller balls engaged in groove means in the outer joint member, with the operative means in the inner joint member being open to permit the roller balls to contact one another, and with the groove means in the outer joint member permitting the roller balls to separate from one another during articulation of the joint. The inner joint member and the outer joint member swivel with respect to one another, independently of the roller balls, by virtue of spherical surface portions on the inner joint member which are surrounded by complemental spherical surface portions on the outer joint member. By this construction, the outer joint member, in effect, traps the inner joint member, and this relationship has the added advantage of permitting the transmission of end loads between the inner and outer joint members without transmitting such loads through the balls.

The combination of the unrestricted rotation of the roller balls in the inner joint member, the entrapment of the inner joint member by the outer joint member independently of the roller balls, and the movement of the roller balls in the groove means placed about the circumference of the outer member provides for smooth, lash-free torque transmission even when the inner and outer joint members have been articulated with respect to one another by up to approximately eight degrees (8°) and for smoother torque transmission than many other types of universal joints when the inner and outer joint members have been articulated with respect to one another by more than approximately eight degrees (8°).

Thus, it is an object of the present invention to provide an improved universal joint having unrestricted rotation of the roller balls utilized therein, with unrestricted movement of the roller balls from positions in contact with one another to positions out of contact with one another during articulation of the joint.

It is a further object of the present invention to provide a universal joint having the roller balls utilized therein travel in rectilinear grooves in the outer member thereof, the rectilinear grooves having cylindrical ball contact surfaces and having the inner joint member trapped by the outer joint member through surface-to-surface contact between complemental spherical surface portions on the inner and outer joint members.

A further object of the present invention is to provide a universal joint capable of accommodating substantial thrusts between the inner and outer joint members thereof.

A further object of the present invention is to provide that the roller balls used in transmitting torque in a universal joint are free to contact each other and to move out of contact with one another during the articulation of the joint.

A further object of the present invention is to provide that the plane of torque transmission of the universal joint does not remain perpendicular to the axis of rotation as the joint is articulated.

A further object of the present invention is to provide a universal joint with lower manufacturing costs than present day devices.

A further object of the present invention is to provide a universal joint which eliminates the use of planar drive surfaces in the transmission of torque.

A further object of the present invention is to provide a universal joint having increased smoothness of performance.

A further object of the present invention is to provide a universal joint having less critical manufacturing tolerances.

A further object of the present invention is to provide a universal joint that is capable of being articulated over a wide range with less lash between the inner and outer members of the joint.

A further object of the present invention is to provide an improved universal joint which is capable of transmitting torque over a wider range of angular articulation between the inner and outer joint members.

A still further object of the present invention is to provide a universal joint that can be connected in series with a multiplicity of like universal joints in a cascaded joint to provide for relatively large amounts of offset or misalignment between the drive and driven members which are connected by such joints.

Further objects and advantages of the present invention will be apparent from the following description and appended claims, reference being made to the accompanying drawings forming a part of this specification, wherein like reference characters designate corresponding parts in the several views.

It is to be understood that the present invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description, and not of limitation.

DETAILED DESCRIPTION OF THE PREFERRED EMBODIMENT

Figure 1:
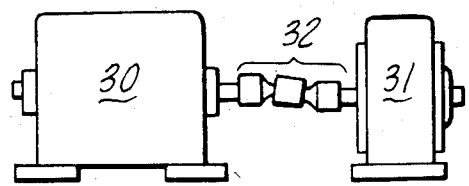
FIG. 1 is a diagrammatic view showing a construction embodying the present invention being utilized where an offset between adjoining torque transmitting shafts is present.

Referring to FIGS. 1 through 5, several uses of the present invention are shown. In FIG. 1 there is shown an application where offset exists between the shaft of a motor 30 and the driveshaft of a gear box 31. The motor and gear box are shown joined by a double universal joint 32 embodying the construction used in the present invention.

Figure 2:
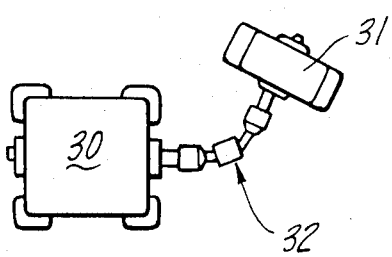
FIG. 2 is a diagrammatic view showing a construction embodying the present invention in use where angular misalignment and/or offset is desired.

FIG. 2 shows the same motor and gear box as shown in FIG. 1 but under a condition where angular misalignment and/or offset is desired. Again, the shaft of the motor 30 and the driveshaft of the gear box 31 are joined by a universal joint, generally designated by the numeral 32.

Figure 3:
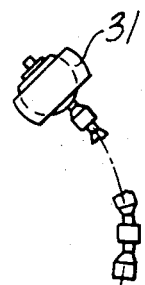
FIG. 3 is a diagrammatic view showing a construction embodying a multiplicity of universal joints of the present invention connected in series in a cascaded joint.

FIG. 3 shows an application where there is a substantial misalignment between the shaft of the motor 30 and the driven shaft of the gear box 31. This misalignment can be accommodated by using a connected series of universal joints 32 to join the motor and the gear box in a cascaded joint.

Figure 4:
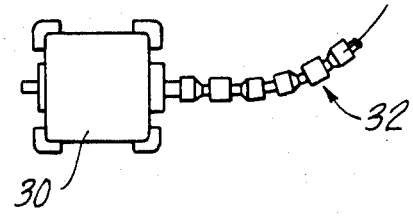
FIG. 4 is a diagrammatic view illustrating a construction embodying the present invention being used in a power take-off system.
Figure 4:
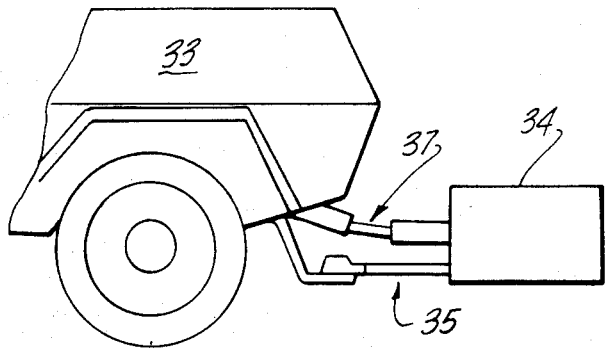

FIG. 4 shows a situation where the construction of the present invention is used as a power take-off. A source of power, such as a farm implement, is illustrated by the numeral 33 and, thus, is towingly connected to a power activated attachment 34 by means of a tow bar 35. The implement 33 provides a driving force for the operation of the power attachment 34. In this case, a universal joint 37 is utilized in providing this driving force.

Figure 5:
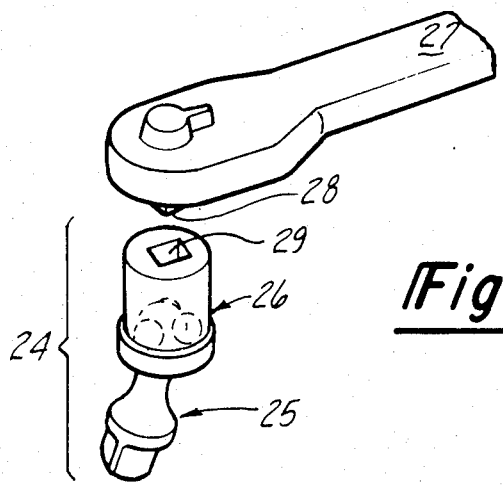
FIG. 5 is a diagrammatic view illustrating a construction embodying the present invention being in conjunction with a standard ratchet wrench of the square drive type.

There is shown in FIG. 5 a conventional ratchet wrench 27 of the square drive type, the drive being provided through an extension 28 which is square in cross-section, as is known in the art. The extension 28 fits into a socket 29 provided in an outer joint member 26 of a universal joint 24. The universal joint 24 also includes an inner joint or pintle member 25.

Figure 6:
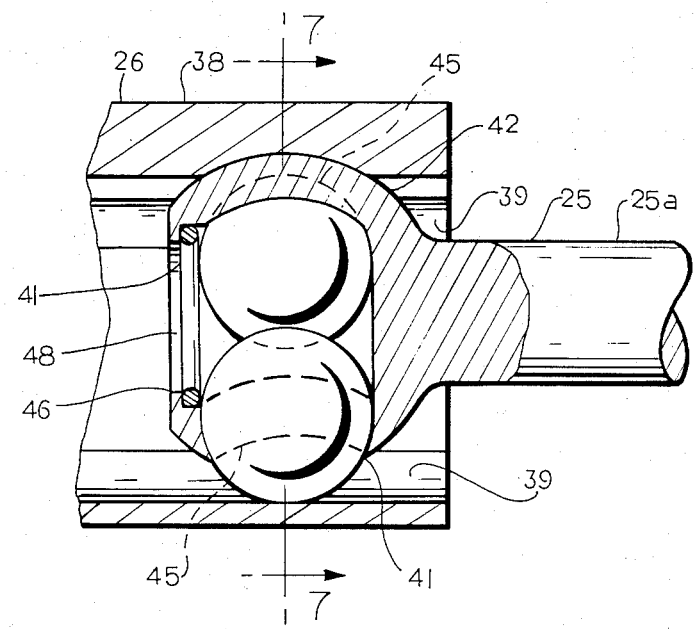
FIG. 6 is a fragmentary elevational view, partly in section, showing a single universal joint of the present invention.
Figure 7:
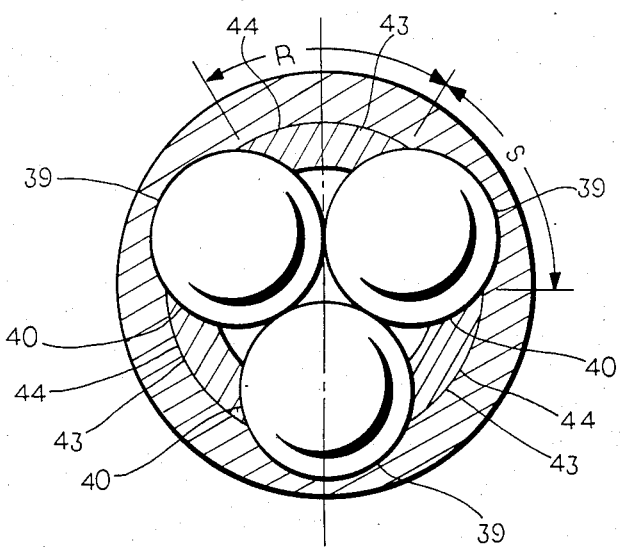
FIG. 7 is a sectional view taken in the direction of the arrows along the section line 7—7 of FIG. 6.

Referring now to FIGS. 6 and 7, the outer joint member 26 has a socket portion, not shown, provided in one end thereof to receive the device to be driven. Immediately adjacent the socket portion is an enlarged portion 38 having three rectilinear circumferentially spaced recesses 39, only two of which are illustrated in FIG. 6. The rectilinear recesses 39 may be spaced equally around the circumference, and have a right circular cylindrical shape in a plane extending transversely through the outer joint member 26 to receive three spherical roller balls 40. Rotational torque is transmitted between the inner joint member 25 and the outer joint member 26 by the roller balls 40, by virtue of the engagement of each roller ball in apertures 41 in an enlarged end portion 42 of the inner joint member 25 and the rectilinear recesses 39 in the outer joint member. As is clear from FIGS. 6 and 7, the centers of the roller balls 40 lie in a plane that extends perpendicularly to the central axis of the inner joint member 25. It is to be noted that it is contemplated that spring-mounted, round-ended pins could be used in place of the roller balls 40 to transmit torque between the rectilinear recesses 39 in the outer joint member 26 and the apertures in the inner joint member 25. Such a construction would detract from the smoothness of operation of the universal joint, but it could still be satisfactory for some applications.

The enlarged end portion 42 of the inner joint member 25 is generally spherically shaped and has spaced-apart, outwardly facing spherical surface portions 43 disposed in a circumferential pattern around the enlarged end portion, the spherically-shaped surface portions 43 and the roller balls 40 being disposed in an alternating series, as is shown most clearly in FIG. 7. Similarly, the inner surface of the outer joint member 26 is provided with spaced-apart inwardly facing spherical surface portions 44, and the spherically-shaped surface portions 44 in the outer joint member 26 lie in close proximity to the spherically-shaped surface portions 43 in the inner joint member, and in radial alignment therewith, to form a ball and socket type swivel joint between the inner and outer joint members. Because of this ball and socket relationship between the inner joint member 25 and the outer joint member 26, these members are able to sustain compressive or tensile end loads therebetween without the imposition of such end loads on the roller balls. Such end loads could interfere with the smooth transmission of torque between the inner and outer joint members by the roller balls.

Angular articulation of the universal joint is permitted by the ball and socket relationship between the inner joint member 25 and the outer joint member 26 and by the rectilinear recesses 39 which permit the roller balls 40 to roll therein to assume new positions as dictated by the relative angular positions of the inner and outer joint members. As is shown in FIGS. 6 and 7, for simplicity in construction and for relatively low manufacturing costs, the aperture means 41 permits the roller balls 40 to contact one another. Of course, when the inner joint member 25 and the outer joint member 26 are articulated with respect to one another from the axially aligned position depicted in FIG. 7, the roller balls 40 will be less restrained within the aperture means 41 of the inner joint member by the rectilinear recesses 39 of the outer joint member, and may tend to separate from one another by virtue of gravity or centrifugal force. Such separation of the roller balls 40 will not lead to substantial lash or free play in the joint, however, because of the ball and socket relationship between the inner joint member and the outer joint member, as heretofore described, even at substantial, e.g., up to approximately eight degree (8°), amounts of angular articulation between the inner joint member 25 and the outer joint member 26.

The facilitate the assembly of the universal joint, the arcuate extent of each of the spherically-shaped surface portions 44 of the outer joint member 26, indicated by dimension "R" in the drawing, will be at least equal to and preferably slightly greater than the arcuate extent of the adjacent roller ball engaging rectilinear recesses 39, as indicated by dimension "S" in the drawing. In this way the inner joint member 25, without the roller balls 40 in place, can be inserted into the outer joint member 26 by aligning the spherically-shaped surface portions 43 of the inner joint member with the rectilinear recesses 39 of the outer joint member and then inserting the inner joint member 25 into the outer joint member 26 until the spherically-shaped surface portions 43 of the inner joint member are axially aligned with the respective spherically-shaped surface portions 44 of the outer joint member. Thereupon, the inner joint member 25 and the outer joint member 26 are rotated relative to one another, sixty degrees (60°) in the case of a three-ball joint, as shown in the drawing, to bring the spherically-shaped surface portions 43 and the spherically-shaped surface portions 44 into the desired radial alignment as shown in FIG. 7. The roller balls 40 are then inserted into the inner joint member 25 through single-ended slots 45 in the end thereof, and the inadvertent escape of the roller balls 40 can be prevented by thereafter inserting a retaining ring 46 to fit behind a peripheral lip 47 in an axial opening 48.

As shown in FIG. 6, the inner joint member 25 has a shaft 25a which may be provided with means, not shown, for attachment to the driving or driven member, for example, the output shaft of a motor or the input shaft of the device being driven by the motor, or the shaft 25a may itself be the motor output shaft or the input shaft of the driven device.

Figure 8:
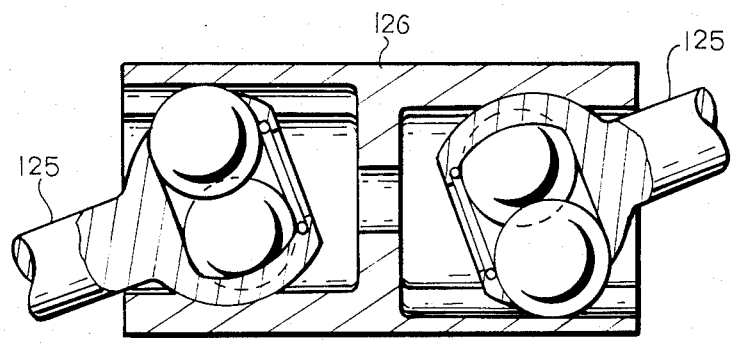
FIG. 8 is a fragmentary elevational view, partly in section, showing a double universal joint of the present invention.

FIG. 8 illustrates a double universal joint which is made up of a single outer joint member 126 and an opposed pair of inner joint members 125, each of which may be considered to be similar in construction to the inner joint member 25 of the embodiment of FIGS. 6 and 7. One of the inner joint members may be assembled into the outer joint member 126 in the manner described with respect to the assembly of the inner joint member 25 and the outer joint member 26 of FIGS. 6 and 7. Because the assembly of the first inner joint member 125 into the outer joint member 126 will block access to the end openings in the other inner joint member, it is necessary to pre-assemble the balls of the inner joint member before inserting the second inner joint member into the outer joint member. This will require that the open end of the outer joint member which receives the second inner joint member initially be large enough to receive such assembled inner joint member from such open end. This open end can then be reduced in size by a suitable forming operation to retain the second inner joint member in place.

While the invention has been described with the preferred embodiment, it should be understood that it is not intended to limit the invention to that embodiment. On the contrary, it is intended to cover all alternatives, modifications, and equivalents which may be included within the spirit and scope of the invention as defined by the appended claims.

What is claimed is:

1. A power transmitting mechanical joint comprising, in combination:
    an inner joint member having a central axis and comprising recess means therein and an end which is generally spherical in configuration, said recess means being located in said generally spherical end;
    an outer joint member comprising a plurality of generally spherical inner surface portions, said plurality of generally spherical inner surface portions of said outer joint member engaging said generally spherical end of said inner joint member to permit angular articulation between said inner joint member and said outer joint member and to prevent relative axial movement between said inner joint member and said outer joint member;

said outer joint member further comprising a plurality of rectilinear recesses extending thereinto; and a plurality of spherical roller balls, each of said roller balls having a center and being rollingly engaged in said recess means in said inner joint member and in one of said rectilinear recesses in said outer joint member, the angular articulation between said inner joint member and said outer joint member causing each of said plurality of spherical roller balls to roll in said recess means in said inner joint member and in said one of said rectilinear recesses in said outer joint member, the centers of each of said spherical roller balls lying in a plane that extends generally transversely of said central axis of said inner joint member, said recess means in said inner joint member providing freedom for each of said plurality of spherical roller balls to contact another of said plurality of spherical roller balls, each of said plurality of spherical roller balls, upon the angular articulation between said inner joint member and said outer joint member, being free to rotate about any axis within said recess means.

2. The mechanical joint according to claim 1, wherein said plurality of spherical inner surface portions of said outer joint member and said plurality of rectilinear recesses in said outer joint member are disposed in an alternating circumferential series of said spherical inner surface portions and said rectilinear recesses.

3. The mechanical joint according to claim 2, wherein the circumferential arcuate extent of each of said plurality of generally spherical inner surface portions is no greater than the circumferential arcuate extent of each of said rectilinear recesses to permit assembly of said mechanical joint.

4. The mechanical joint according to claim 1, wherein said plurality of spherical roller balls comprises at least three of said spherical roller balls and wherein said recess means in said inner joint member permits each of said plurality of spherical roller balls to contact two other of said plurality of spherical roller balls.

5. The mechanical joint according to claim 4, wherein said plurality of rectilinear recesses in said outer joint member permits said spherical roller balls to separate from one another when said inner joint member and said outer joint member have been articulated with respect to one another.

6. The mechanical joint according to claim 1, wherein said plurality of rectilinear recesses in said outer joint member permits said spherical roller balls to separate from one another when said inner joint member and said outer joint member have been articulated with respect to one another.

7. The mechanical joint according to claim 1, wherein said inner joint member comprises opening means in said end thereof adjacent said recess means to permit the insertion of said spherical roller balls in said recess means after said inner joint member and said outer joint member have been assembled with respect to each other.

8. The mechanical joint according to claim 7 further comprising retaining means for closing said opening means in said end of said inner joint member for retaining said spherical roller balls in said recess means in said inner joint member.

* * * * *

UNITED STATES PATENT AND TRADEMARK OFFICE
CERTIFICATE OF CORRECTION

PATENT NO.  : 4,634,402
DATED       : January 6, 1987
INVENTOR(S) : Daniel W. Hazebrook It is certified that error appears in the above-identified patent and that said Letters Patent is hereby corrected as shown below:

Column 5, line 64, delete "The facilitate" and insert ---- To facilitate ----.

Signed and Sealed this

Fifth Day of January, 1988

Attest:

DONALD J. QUIGG

*Attesting Officer*  *Commissioner of Patents and Trademarks*